United States Patent [19]
Cook et al.

[11] Patent Number: 5,413,633
[45] Date of Patent: May 9, 1995

[54] CONCRETE

[75] Inventors: Phillip B. Cook, Rufford; James B. Walker, Keighley, both of United Kingdom

[73] Assignee: British Gas plc, London, United Kingdom

[21] Appl. No.: 108,654

[22] PCT Filed: Jun. 19, 1992

[86] PCT No.: PCT/GB92/01122

§ 371 Date: Sep. 1, 1993

§ 102(e) Date: Sep. 1, 1993

[87] PCT Pub. No.: WO92/22513

PCT Pub. Date: Dec. 23, 1992

[30] Foreign Application Priority Data

Jun. 19, 1991 [GB] United Kingdom ............... 9113267

[51] Int. Cl.⁶ .............................................. C04B 18/30
[52] U.S. Cl. ..................... 106/672; 106/677; 106/724; 106/745; 106/763; 588/257
[58] Field of Search ............... 106/672, DIG. 1, 677, 106/682, 697, 705, 708, 709, 739, 746-746, 763, 823; 428/903.3; 501/155; 423/DIG. 18, DIG. 20; 264/37, DIG. 49; 588/252, 256, 257; 210/751

[56] References Cited

U.S. PATENT DOCUMENTS

| | | |
|---|---|---|
| 1,895,159 | 1/1933 | Greenwalt . |
| 2,017,022 | 10/1935 | Roos . |
| 3,600,476 | 8/1971 | Takamura et al. . |
| 3,847,806 | 11/1974 | Kuroiwa et al. ............. 106/697 |
| 4,507,127 | 3/1985 | Hirose . |
| 4,583,470 | 4/1986 | Hirose . |

FOREIGN PATENT DOCUMENTS

| | | |
|---|---|---|
| 2949528 | 6/1981 | Germany . |
| 53-31723 | 9/1976 | Japan . |
| 54-8624 | 1/1979 | Japan . |
| 61-205646 | 9/1986 | Japan . |
| 3-40948 | 2/1991 | Japan . |

OTHER PUBLICATIONS

*Concrete Admixtures Handbook, Properties, Science and Technology* V. S. Ramachandran (1984) pp. 270–272.
"Reclamation of Wastewater and Sludge for Concrete Mixing", Tay, 2438 Resources, Conservation and Recycling, Jul. 2, 1989, No. 3., Amsterdam, NL, pp. 211–227.

*Primary Examiner*—Mark L. Bell
*Assistant Examiner*—Paul Marcantoni
*Attorney, Agent, or Firm*—Larson and Taylor

[57] ABSTRACT

A concrete mortar is formed by mixing together sand, cement, water and a sewage sludge ash. A foam is added to the mortar to form a foamed concrete composition.

7 Claims, No Drawings

CONCRETE

FIELD OF THE INVENTION

The present invention relates to a hardened concrete and a method of making such concrete.

BACKGROUND OF THE INVENTION

Sewage sludge ash is a byproduct of the incineration of sewage sludge in specially designed incinerators. This is a cheap and relatively environmentally acceptable way of treating the sludge which otherwise tends to be discharged as raw sewage into the sea. However, wider use of this technique has been hampered by the inability to find a use for the ash and therefore a means of obviating the need to dump it in landfill sites which are becoming scarce and expensive.

The applicants have found surprisingly that the ash can be used in the production of concrete, particularly foamed concrete.

According therefore to one aspect of the present invention a hardened concrete contains sewage sludge ash.

Preferably the concrete is foamed concrete, i.e., concrete containing a mass of gas bubbles.

Suitably the ash content lies between 15% and 35% by weight of the total weight of the concrete.

The concrete may have a density lying between 1150 and 1500 $Kg/m^3$.

Preferably apart from the ash, the concrete also contains sand and cement.

The invention therefore provides a use for the ash and additionally and as importantly a reduced cost concrete over that containing merely sand and cement since the ash provides a cheap sand substitute.

According to another aspect of the present invention a method is provided for making concrete comprising mixing together sewage sludge ash with sand and cement and water to form a mortar.

Suitably after forming the mortar a foam is added to the mixture to form a foam concrete.

Conveniently the foam is produced by aerating a mixture of soap solution and water.

An embodiment of the invention will now be particularly described with reference to the following example.

390 Kg of sand, 390 Kg of sewage sludge ash, and 390 Kg of cement are mixed together in a conventional concrete mixer and 500 Kg of water is added to form a mortar. A foam produced by aerating a soap solution/water mixture in which the soap solution comprises 5% by weight of the mixture is then added to the mortar to produce a foam concrete which is then poured into a mould to form blocks or may be used to fill trenches and cavities.

After adding the foam the weights of the sand, ash, cement and water is found to be respectively 316 Kg, 316 Kg, 316 Kg and 411 Kg.

This particular mix is most suitable for filling roadside or road-way trenches.

The density of the unhardened foam concrete is 1360 $Kg/m^3$ and this is found to drop to about 1300 $Kg/m^3$ when the concrete hardens.

The ash content of the hardened concrete is found to be about 24% by weight but it comprises over 50% by volume of the concrete.

If this type of foam concrete is to be used for some other application such as general void fill, the same base mix could be used but more foam could be added as lower strength could be tolerated. However, as the foam is so light, the weight percentages would remain about the same.

We claim:

1. A foamed concrete composition comprising sewage sludge ash and a foam comprising an aerated mixture of soap solution and water.

2. A concrete composition according to claim 1 wherein the ash content comprises between 15% and 35% by weight of the total weight of the concrete composition.

3. A concrete composition according to claim 1 wherein the density of the concrete comprises between 1150 $Kg/m^3$ and 1500 $Kg/m^3$.

4. A concrete composition according to claim 1 wherein the concrete further comprises sand and cement.

5. A method for making concrete comprising the steps of mixing together sand, cement, water and sewage sludge ash to form a mortar and adding a foam to the mortar to form a foamed concrete composition.

6. A method for making concrete according to claim 5 further comprising the step of aerating a mixture of soap solution and water to produce the foam.

7. A foamed concrete composition manufactured in accordance with the method of claim 5.

* * * * *